(12) United States Patent  (10) Patent No.: US 7,797,750 B2
Ho et al.  (45) Date of Patent: Sep. 14, 2010

(54) DATA SECURITY SYSTEM

(75) Inventors: Joshua Ho, Los Angeles, CA (US); Gyu Nam Choi, Seoul (KR)

(73) Assignee: Newport Scientific Research LLC, Newport Beach, CA (US)

( * ) Notice: Subject to any disclaimer, the term of this patent is extended or adjusted under 35 U.S.C. 154(b) by 1087 days.

(21) Appl. No.: 11/070,417

(22) Filed: Mar. 2, 2005

(65) Prior Publication Data

US 2006/0036873 A1  Feb. 16, 2006

Related U.S. Application Data

(60) Provisional application No. 60/600,138, filed on Aug. 10, 2004.

(51) Int. Cl.
*G06F 21/00*  (2006.01)
(52) U.S. Cl. .......................... 726/26; 713/186
(58) Field of Classification Search ................. 382/116, 382/124; 726/27–30; 713/165, 168, 186
See application file for complete search history.

(56) References Cited

U.S. PATENT DOCUMENTS

| | | | | |
|---|---|---|---|---|
| 5,420,936 A | * | 5/1995 | Fitzpatrick et al. | 382/124 |
| 5,596,718 A | * | 1/1997 | Boebert et al. | 726/16 |
| 2002/0188855 A1 | * | 12/2002 | Nakayama et al. | 713/186 |
| 2003/0018910 A1 | * | 1/2003 | Wert et al. | 713/200 |
| 2003/0131247 A1 | * | 7/2003 | Cannon | 713/186 |
| 2003/0204735 A1 | * | 10/2003 | Schnitzmeier | 713/186 |

FOREIGN PATENT DOCUMENTS

EP  1265121 A2 * 12/2002

* cited by examiner

*Primary Examiner*—Gilberto Barron, Jr.
*Assistant Examiner*—Venkatanarayanan Perungavoor
(74) *Attorney, Agent, or Firm*—Rader, Fishman & Grauer PLLC (57) ABSTRACT

A data security system controls access to and interfaces with a computer system by requiring user verification through fingerprint sensing. The data security system includes a security module having a fingerprint sensor, image data, and an application interface that is generated by the security module and communicative with the computer system. The image data is associated with a fingerprint of a user through the use of the security module.

29 Claims, 7 Drawing Sheets

FIG. 7 ized access to data stored in computer systems has been a source of increased concern to the public. This source of concern has originated from the growing onslaught of computer and internet crimes by unauthorized users gaining entry to these systems. In response, designers have developed various methods and systems to prevent unauthorized access to computer systems.

DATA SECURITY SYSTEM

CROSS REFERENCE TO RELATED APPLICATIONS

This application claims priority to U.S. Provisional Application 60/600,138, filed on Aug. 10, 2004, which is incorporated herein by reference in its entirety.

TECHNICAL FIELD

The present invention relates generally to a system and method for controlling access to data and more specifically to a system and method that utilizes fingerprint authenticity for controlling access to data.

BACKGROUND

Since the advent of the internet and the increasing amount of commerce transacted over the internet, unauthorized access to data stored in computer systems has been a source of increased concern to the public. This source of concern has originated from the growing onslaught of computer and internet crimes by unauthorized users gaining entry to these systems. In response, designers have developed various methods and systems to prevent unauthorized access to computer systems.

Specifically, designers have embedded computer programs within computer systems that require the entry of passwords and logins prior to accessing the computer systems. Passwords and logins have proved effective in curtailing unauthorized access, but have several disadvantages. Initially, it is possible that unauthorized users can obtain the passwords and logins for the computer system simply by trial and error or by the use of sophisticated computer programs capable of determining the same. Secondly, authorized users have been prone to forget, misplace, or lose the password and login information, which creates the additional burden of acquiring a new password and login combined with an increased delay in accessing the computer system.

In view of the above disadvantages, designers have developed systems that do not require entry of a password or login, but instead require electronic scanning of a physical feature of the user prior to gaining system access. For example, conventional systems are designed to scan the user's eye or fingerprint. The foregoing disadvantages of the conventional password and login system are reduced, but these scanning systems have disadvantages as well. For example, the conventional scanning systems have a sensor for scanning and a separately attached controller or system that analyzes the scanned information. Accordingly, the scanning sensor alone does not possess the processing functionality to grant or deny access to the computer system. Secondly, conventional scanning systems merely serve as a single entry point into the computer system. Particularly, once a user has acquired access to the computer system, the conventional scanning systems are incapable of further controlling and monitoring user access to specific applications on the computer system. Thirdly, the conventional scanning systems are not portable. That is, once conventional scanning systems are installed on the computer system, they are incapable of easy transfer to other computers. Where the user has several computers (e.g., at home and at work), the user is required to purchase an additional scanning system or secure a single computer system only.

The embodiments described hereinafter were developed in light of these and other disadvantages of existing data security systems.

SUMMARY

A data security system is disclosed that controls access to and interfaces with a computer system by requiring user verification through fingerprint sensing. The data security system includes a security module having a fingerprint sensor, image data, and an application interface that is generated by the security module and communicative with the computer system. The image data is associated with a fingerprint of a user through the use of the security module.

BRIEF DESCRIPTION OF THE DRAWINGS

These and other features and advantages will be apparent from the following detailed description and the appended claims, taken in conjunction with the accompanying drawings, in which:

DETAILED DESCRIPTION

Figure 1:
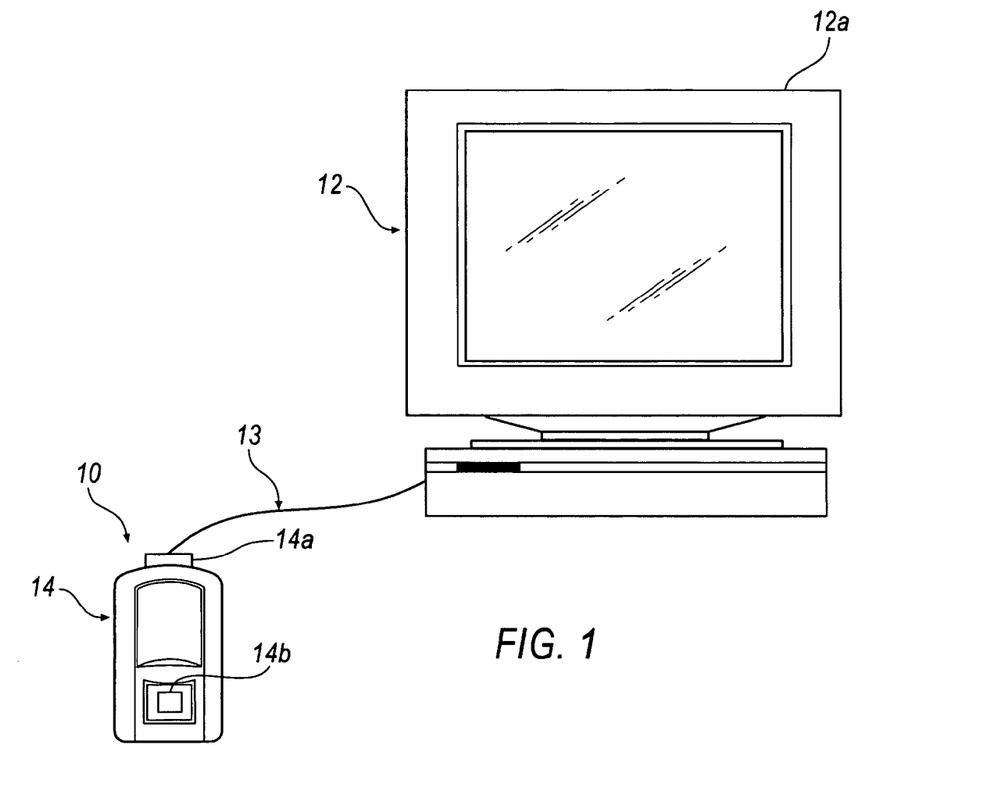
FIG. 1 illustrates a data security system having a security module coupled to a computer system.

Referring to FIG. 1, a data security system 10 is illustrated that prevents unauthorized access to computer and internet systems through the use of biometric sensing. Data security system 10 includes a security module 14 having a connector port 14a. A computer system 12 having a monitor 12a is coupled to data security system 10 by the use of a wire 13. Computer system 12 may be a personal computer, main frame, personal digital assistant (PDA) or any other computing device. Wire 13 is connected to security module 14 at the connector port 14a. In one embodiment, connector port 14a is a universal serial bus (USB) type connector. Accordingly, wire 13 may be a USB or any other appropriate connecting cable that is compatible with connector port 14a and computer system 12. A fingerprint sensor 14b is integrated with security module 14 for obtaining biometric data such as fingerprint characteristics. As will be discussed in detail herein, data security system 10 also includes data security software (not shown) that is operable on security module 14 and computer system 12.

Figure 2A:
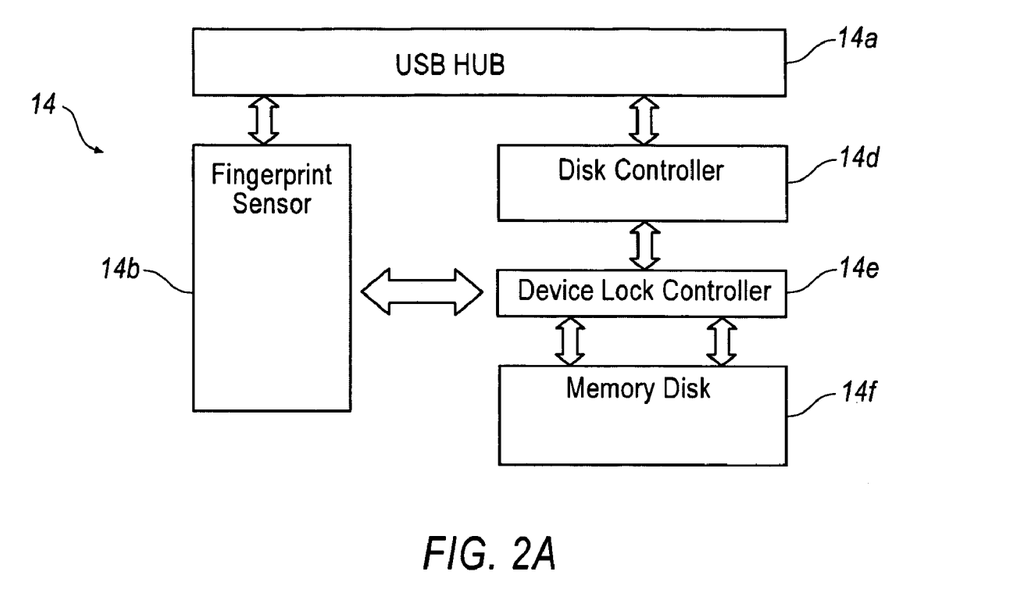
FIGS. 2A and 2B illustrate a detailed block diagram of the security module of FIG. 1 having a fingerprint authentication sensor.
Figure 2B:
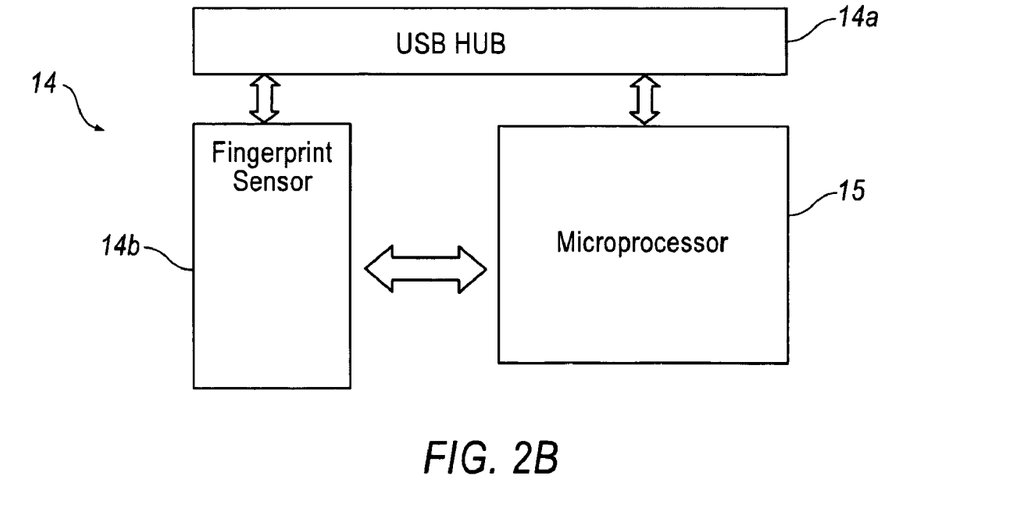

Referring to FIG. 2A, a detailed block diagram of security module 14 is shown. As described above, security module 14 includes a fingerprint sensor 14b that electronically scans a user's finger for a fingerprint. Fingerprint sensor 14b may be a silicon type sensor or any other type of biometric sensor capable of adequate fingerprint scanning. Fingerprint sensor 14b is communicative with a device lock controller 14e. Device lock controller 14e controls access to the memory storage of security module 14. Device lock controller 14e is capable of encrypting and decrypting data located in data security system 10. Accordingly, device lock controller 14e is coupled to a disk controller 14d and a memory disk 14f. As will be discussed herein, disk 14f is capable of storing user registration information such as biometric data (e.g., fingerprint characteristics), passwords, logins, and computer application information. In one embodiment, disk 14f may have flash memory storage for information contained therein. Disk 14f may be partitioned into protected and unprotected storage. In some embodiments protected storage is programmed to be read-only. That is, a registered user may access the stored data but may not modify the data. Preferably, memory disk 14f has a relatively large storage space as compared with some conventional flash memory devices. For example, in one embodiment the storage space may range from 124 mega-bytes to 2 giga-bytes. Additionally, memory disk 14f may have memory storage dedicated to user fingerprint characteristics. Accordingly, in one embodiment the security module 14 may have a storage space of up to 4 mega-bytes for fingerprint characteristics. It is recognized, however, that in other embodiments of the security module 14, a larger range of storage space may be preferred in view of design and/or performance requirements. Upon user verification by device lock controller 14e, disk controller 14d enables access to memory disk 14f. In FIG. 2A, disk controller 14d, device lock controller 14e, and memory disk 14f are shown as separate components. However, it is recognized that disk controller 14d, device lock controller 14e, and memory disk 14f may be embodied as a single microprocessor 15 as shown in FIG. 2B. Continuing with FIG. 2A, connector port 14a is coupled to the fingerprint sensor 14b and the disk controller 14d. As discussed above, connector port 14a serves as a connection point between security module 14 and external devices, such as the computer system 12 (FIG. 1).

Figure 3:
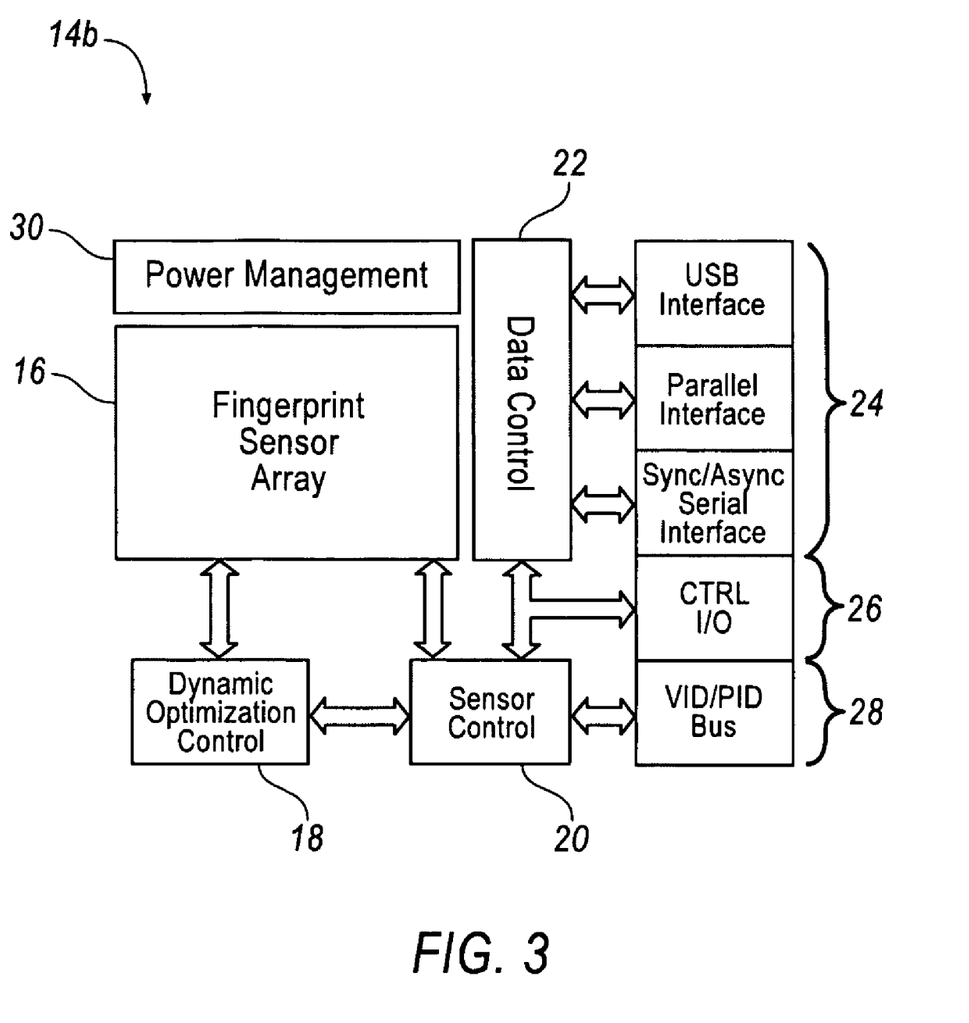
FIG. 3 illustrates a detailed block diagram of the fingerprint authentication sensor of FIGS. 2A and 2B.

Now, referring to FIG. 3, a detailed block diagram of the fingerprint sensor 14b of security module 14 is shown. A fingerprint sensor array 16 detects a user's fingerprint when the finger is placed upon the fingerprint sensor 14b. Fingerprint sensor array 16 may utilize either an image matching method or a minutiae information calculating method during authentication. The image matching method captures images of the fingerprint and compares it to registered fingerprint images. The minutiae information calculating method compares data calculated from characteristics of the user's fingerprint with registered fingerprint characteristics. Accordingly, in either case, fingerprint sensor array 16 forms an electronic image of the user's fingerprint. During imaging, a small signal is applied to the user's finger, and a digital pattern of the fingerprint is created. Fingerprint sensor array 16 may have a resolution of 128 pixels by 128 pixels and may capture images of a fingerprint at 13.3 frames per second. Images taken by sensor array 16 may have a user selectable image density in a range of 250 dots-per-inch to 1000 dots-per-inch.

A dynamic optimization control 18 analyzes each scanned image and generates an accurate fingerprint image without regard to unusual skin conditions or skin surface contamination. A sensor control 20 is communicative with dynamic optimization control 18, fingerprint sensor array 16, a data controller 22, an input/output control 26, and a voltage identification/physical identification Bus (VID/PID Bus) 28. Sensor control 20 controls the rate of scanning and imaging by sensor array 16. Data controller 22 controls the flow of data entering and exiting fingerprint sensor 14b. Accordingly, data controller 22 is communicative with a communication interface 24. As shown, interface 24 has multiple types of interfaces including a universal serial bus (USB) interface, a parallel interface, and a synchronized/asynchronous serial interface. Multiple types of interfaces enable fingerprint sensor 14b to communicate with devices having varying communication interfaces. Input/output control 26 is capable of controlling the flow of data and/or control signals entering and exiting fingerprint sensor 14b. VID/PID Bus 28 enables the flow of video and other data from other devices. Furthermore, fingerprint sensor 14b may include a power management device 30 for controlling the power consumption of security module 14.

Referring to FIGS. 2A, 2B, and 3, when the fingerprint sensor 14b scans a user's finger, the device lock controller 14e determines whether or not the user is an authorized (e.g., registered) user. Where the device lock controller 14e determines the user is not registered, the user is disallowed further access to security module 14 and computer system 12 (FIG. 1). Where the user is determined to be a registered user, device lock controller 14e allows user access of data stored on disk 14f and computer system 12.

Data Security System Process Flows

Figure 4:
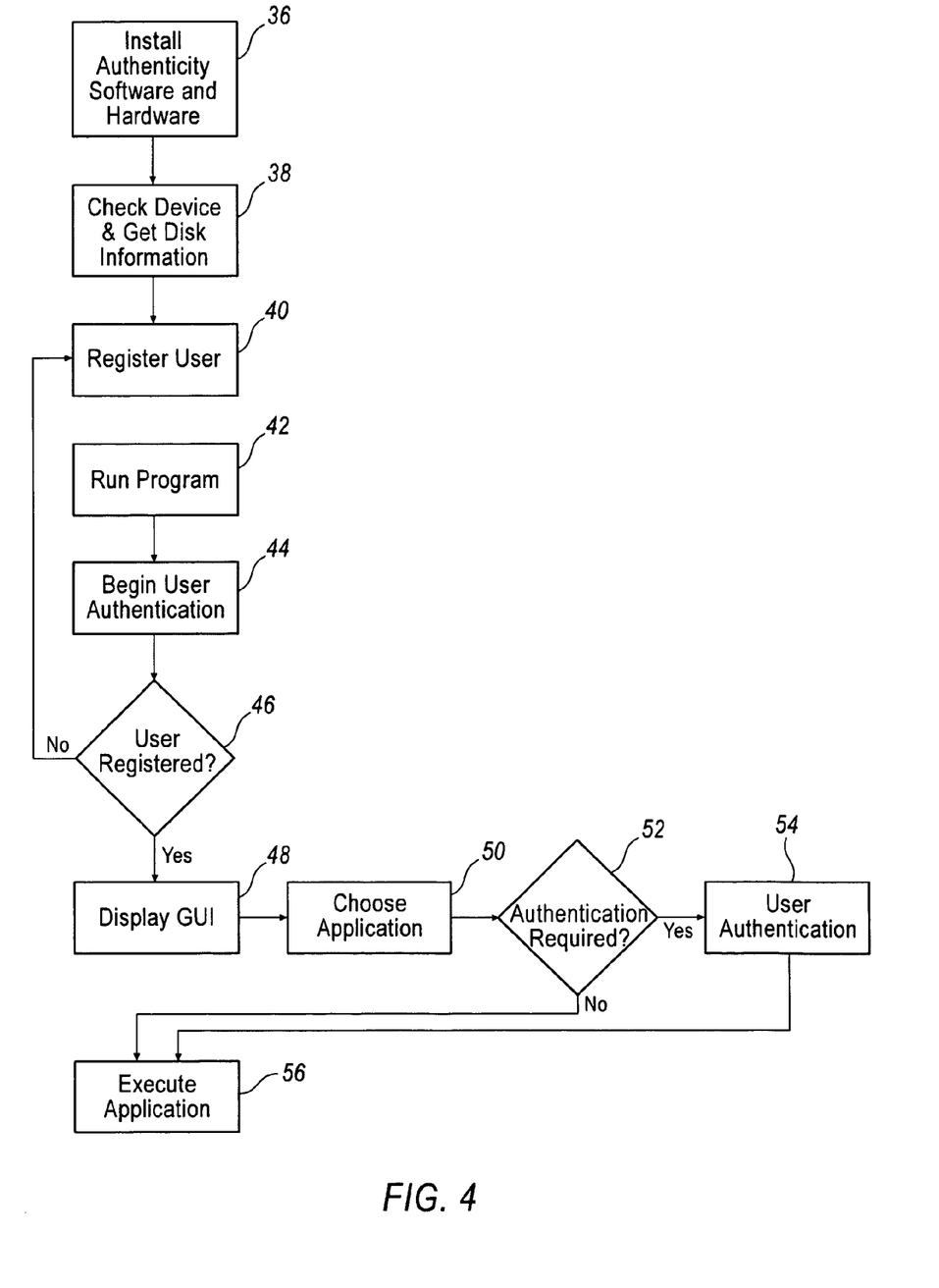
FIG. 4 illustrates a general flow chart showing installation and a method of operation for the data security system of FIG. 1.

Now, referring to FIGS. 4-7, exemplary data, system, and control process flows for data security system 10 are illustrated. Accordingly, FIG. 4 illustrates a simplified flow chart for installation, registration, and execution of data security software that is operable on the security module 14 and computer system 12 (FIG. 1). As will be discussed in detail herein, the data security software is capable of controlling access to computer system 12 and data security module 14, and interfacing with software applications on computer system 12. For example, the data security software enables security module 14 to store in memory, login/password and bookmark information for internet websites. Data security software may also enable security module 14 to store database information such as address books. Additionally, data security software is adapted to interface with email applications resident on computer system 12. Yet another function of the data security software is to allow a registered user to encrypt and de-crypt files on the computer system 12 through the use of the fingerprint authentication function. The foregoing functions will be discussed in detail herein.

Referring back to FIG. 4, at a step 36, data security software and the security module 14 are installed on the computer system 12. As discussed in the foregoing, the security module 14, having the data security software in memory, may be installed onto computer system 12 by coupling the connector port 14b to computer system 12 through the use of a conventional USB port (not shown) on computer system 12. Having the data security software stored on memory disk 14f (FIG. 2) and utilizing the USB port enables the portability of data security system 10. Particularly, a registered user may simply disconnect the security module 14 from one computer system and connect security module 14 to another computer system without the requirement of installing additional software through the use of an external disk. Therefore, data security system 10 provides the conveniences of user-friendly portability with added data security through the use of fingerprint authentication.

At a step 38, the data security system 10 runs a diagnostic check on security module 14 and accesses stored information on the memory disk 14f (FIG. 2). At a step 40, data security system 10 the registration process begins by scanning the user's fingerprints. At step 40, the user may be prompted by a graphical user interface on, for example, computer system 12 that provides directions for the registration process. The registration process at step 40 is required only once per user. During registration, data security system 10 creates an encryption key for each user having three sub-parts. Accordingly, the encryption key includes a digital template of the user's fingerprint, any user passwords/logins for computer system 12, and a random digit generated by data security system 10. After the encryption key is created, subsequent access to computer system 12 through the use of data security system 10 requires the submission of a valid encryption key. If one sub-part of the encryption key is unavailable or invalid, the entire encryption key is invalid and access to the data security system 10 and computer system 12 is forbidden. When the registered user initiates access to data security system 10 by the placement of the user's finger on the fingerprint sensor, the fingerprint data is compared with the encryption key digital template. Accordingly, data security module 14 provides the user passwords/logins and the random digit to complete the encryption key. Once steps 36 and 38 are completed on a particular computer system, the user is not required to repeat these steps in subsequent uses of that computer system.

At a step 42, following registration, the user may execute the data security program to access and interface with programs located on computer system 12 and data security system 10. The execution of the data security software program may occur by clicking an icon (not shown) on computer monitor 12*a* (FIG. 1) through the use of a conventional computer mouse (not shown). Data security system 10 will then prompt the user, at a step 44, to begin user authentication by placing his/her finger on the fingerprint sensor 14*b*. It is recognized however, that in some embodiments, execution of the data security software may automatically occur when a user places his/her finger on the fingerprint sensor. At a step 46, the data security system 10 will determine whether the user is registered. If the user is not registered, the method returns to step 40 for registration. If the user is registered, a step 48 occurs where a computer application interface (e.g., graphical user interface) appears that allows the user to select various software applications located on the security module 14 and computer system 12 (FIG. 1). At a step 50, the user selects a software application. At a step 52, the data access software determines whether the selected software application requires additional user verification. The above functionality provides an additional layer of data security for computer applications that may contain confidential user information, such as email applications. For those applications that require additional fingerprint authentication, a step 54 occurs. Where no additional fingerprint authentication is required, a step 56 occurs. At step 56, the selected application (e.g., internet, email, etc.) is executed. Now, various steps described in the foregoing flow diagram will be discussed in further detail.

User Registration Sub-Flow Process

Figure 5:
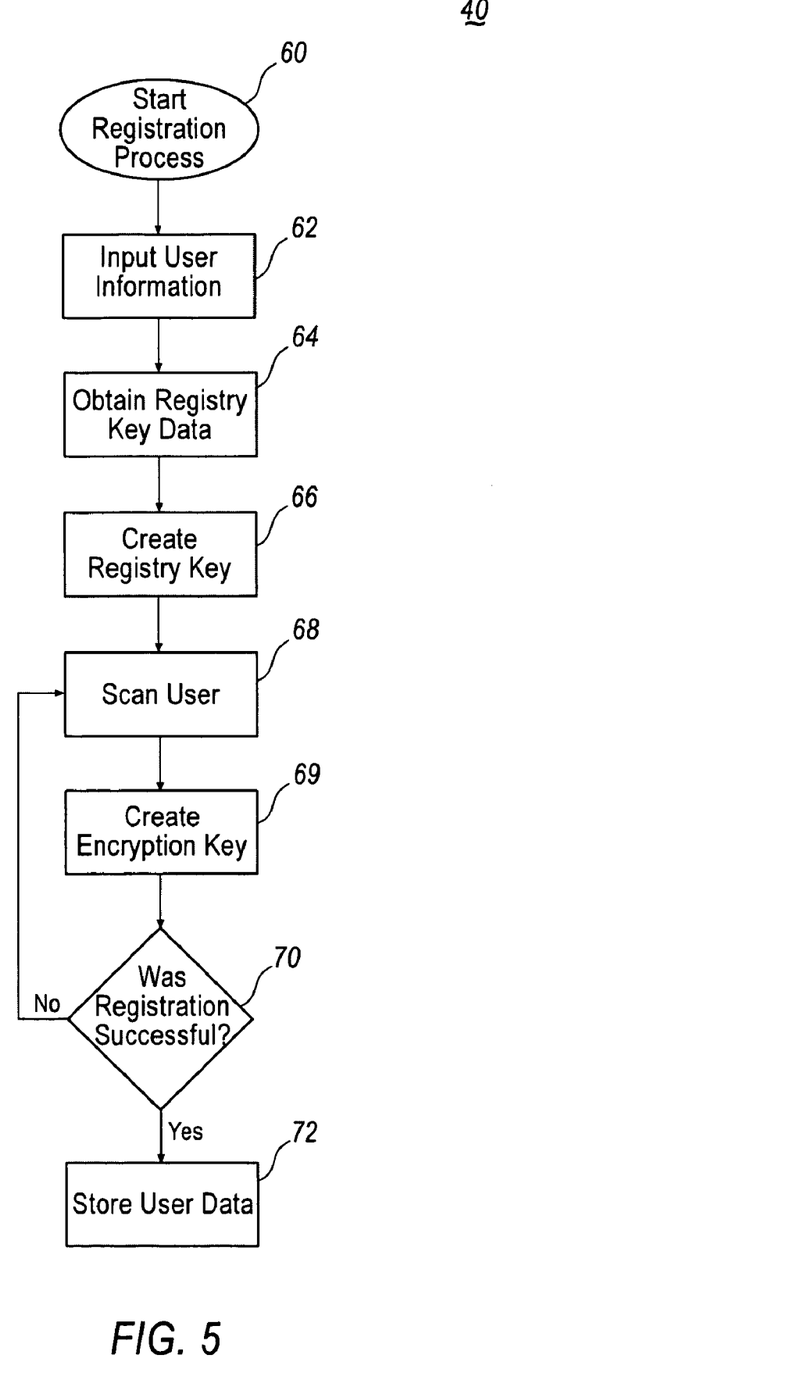
FIG. 5 illustrates a detailed flow chart of user registration for access to a computer system through the use of the data security system of FIG. 1.

Referring to FIG. 5, a detailed flow diagram illustrates the step 40 of FIG. 4. A step 60 is the entry point into user registration sub-flow 40. At a step 62, user information such as the user's name, any passwords/logins, and any serial numbers associated with computer system 12 are input into the security module 12. The user may input the foregoing information through the use of a keyboard (not shown) that is connected to computer system 12. At a step 64, the data security software obtains information from the computer system registry key. For example, at step 64 information such as computer system hardware settings, vendor and product identifications, and file associations are obtained. At a step 66, data security software located on data security system 10 creates a registry key for security module 14. Accordingly, the created registry key contains information pertaining to security module 14 such as the type and configuration of security module 14. Additionally, in some embodiments, step 66 may include deleting any data found in the computer system registry.

At a step 68, the user is prompted through a graphical user interface on computer system 12 to place his/her finger on the fingerprint sensor. Once the fingerprint sensor detects the user's finger, the security module performs multiple scans of the finger. The data security software then initiates the dynamic optimization process where the most accurate scanned sections of the finger are identified from the multiple scans. Accordingly, the security module 14 forms a digital composite of the user's fingerprint from the most accurate scanned sections. Furthermore, at step 68, the user may be prompted to have additional fingers scanned or to have a second user scanned for registration. At a step 69, the encryption key is created for each scanned finger, which uniquely identifies the user. As discussed above, the encryption key may be comprised of several sub-parts that include the digital template of the user's fingerprint, any user passwords/logins for computer system 12, and the random digit generated by data security system 10. At a step 70, the data security software determines whether the registration has been successful. Specifically, the data security system 10 checks whether or not all pertinent user registration information has been obtained. If the registration has been successful, a step 72 occurs where the user information, including fingerprint data, is stored in memory on the memory disk 14*f* (FIG. 2). If the registration was not successful, the process returns to step 68 for re-scanning and optimization of the user's fingerprint.

Hardware Verification and Program Execution Sub-Flow Process

Figure 6:
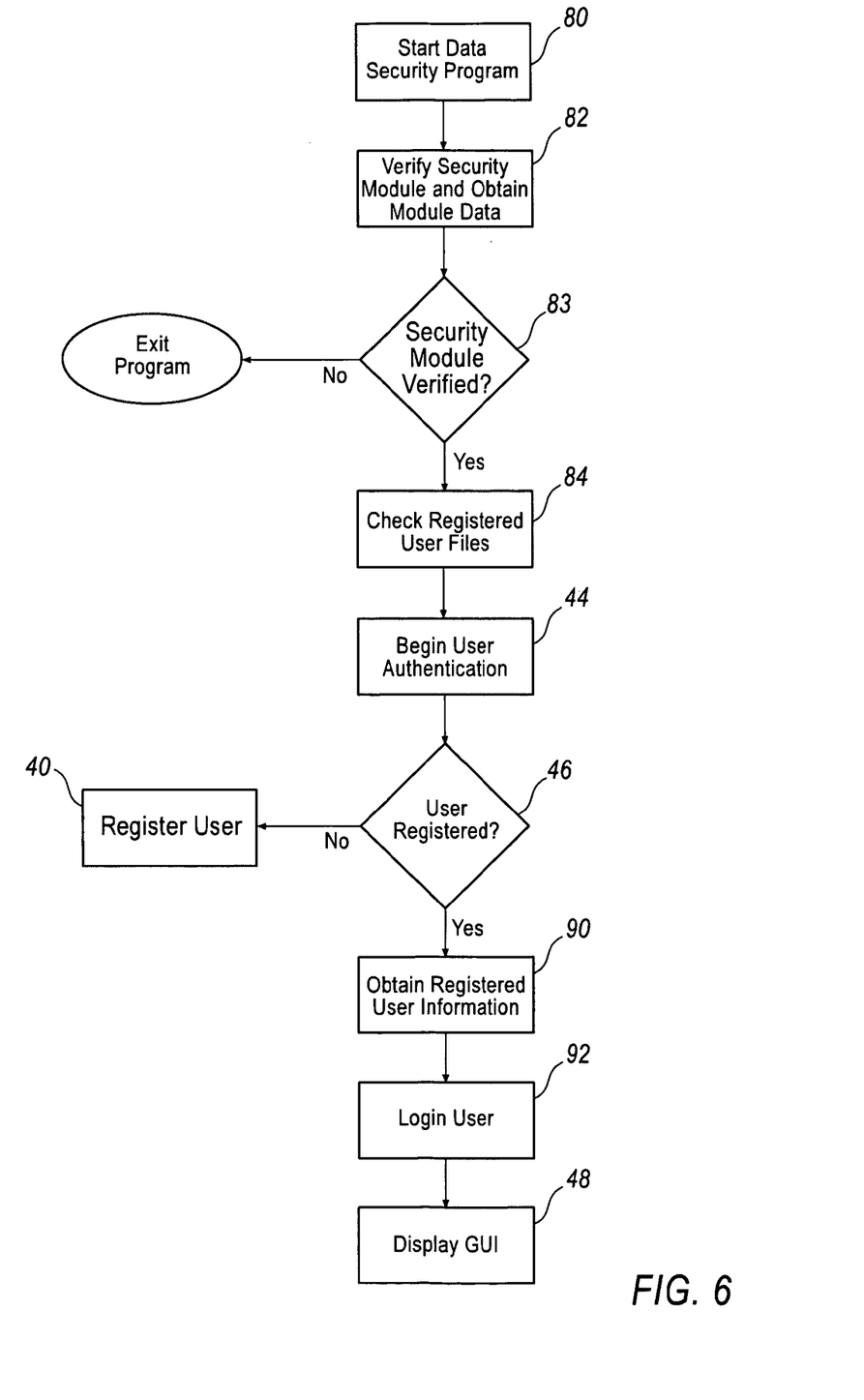
FIG. 6 illustrates a detailed flow chart of system verification of the data security system of FIG. 1.

Referring to FIG. 6, a detailed flow diagram of steps 42-48 of FIG. 4 are illustrated, which includes hardware (e.g., security module) verification and program execution. Accordingly, those steps in FIG. 6 that are the identical to the steps in FIG. 4 are referred by identical reference numbers.

At a step 80, the user may initiate the hardware verification, for example, by double-clicking, through the use of a computer mouse, on an icon displayed on monitor 12*a* of computer system 12. At a step 82, the data security software verifies whether the security module is installed and coupled to the computer system. Accordingly, at a step 83, the data security software verifies the security module identification data. If the security module is not verified the program exits. If the security module is verified, a step 84 occurs. At step 84, the data security software checks for registered user files and checks the registered user files for errors. Additionally, at step 84, the registered user files are secured by the data security software. In one embodiment, the data security software contains a hash function that is capable of securing the register user files from unauthorized access.

At step 44, the user is prompted through a graphical user interface (GUI) to place his/her finger on the fingerprint sensor. Accordingly, at step 44 the data security software scans the user's finger for comparison with the registered user data in memory. At a step 46, the data security software determines whether the scanned data matches the registered user data in memory. If the scanned data does not match the registered user data, step 40 occurs where the user is allowed to register. In other embodiments, the program may exit if the scanned data does not match the registered user data. Where the scanned data matches the registered user data, a step 90 occurs. At step 90, the data security software obtains the associated registered user data in memory. Accordingly, the user is logged on to data security module 14 and computer system 12 (FIG. 1) by the data security software at a step 92.

At step 48, data security system 10 displays a GUI for data security system 10 and computer applications located on computer system 12.

GUI and Fingerprint Authentication Sub-System

Figure 7:
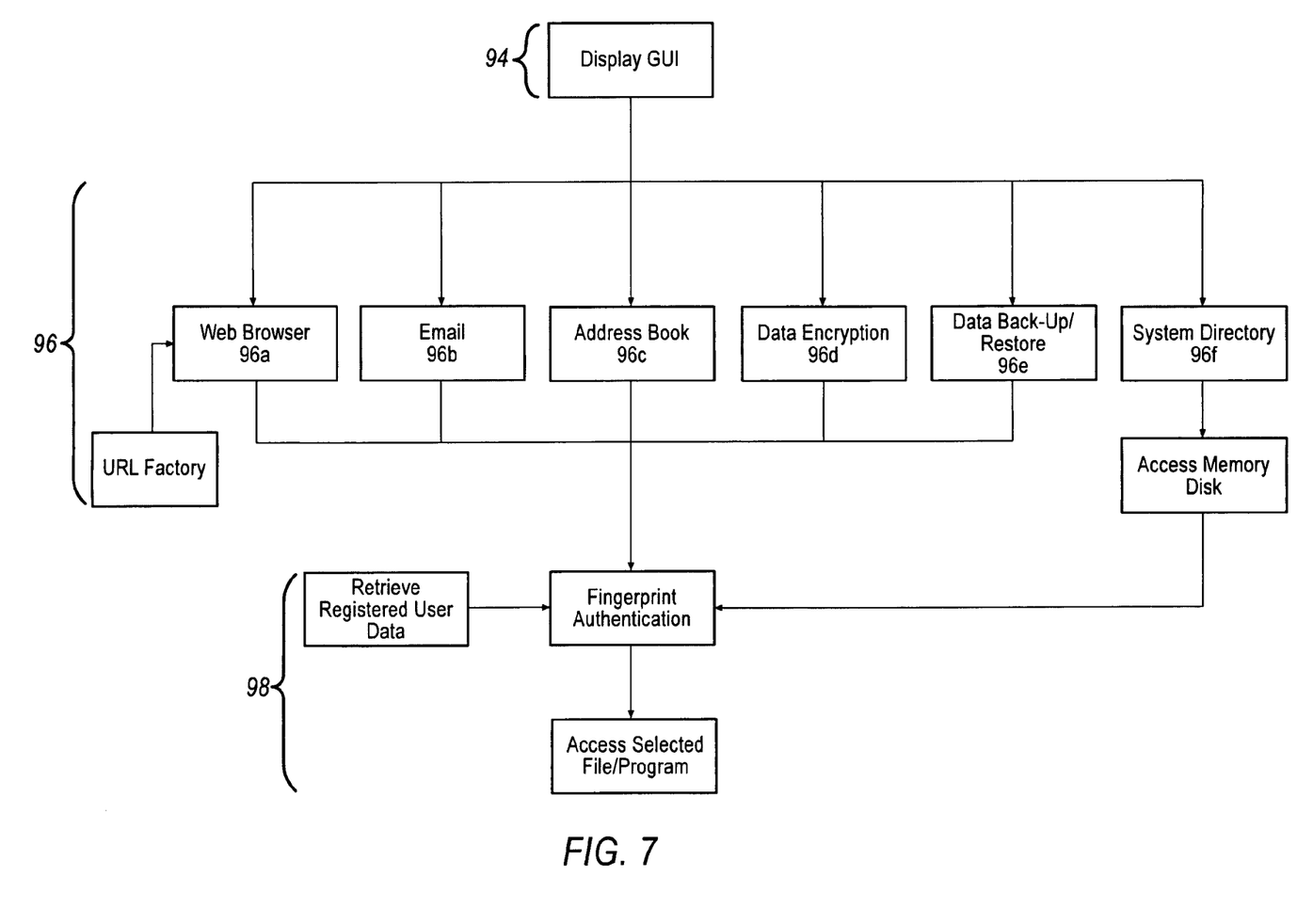
FIG. 7 illustrates a system diagram that shows exemplary software applications that may be selected by a registered user on a computer system having the data security system of FIG. 1.

As described in the foregoing steps 48 of FIGS. 4 and 6, data security system 10 displays a GUI for selection of computer applications loaded on computer system 12 and data located on data security module 14. In summary, the GUI serves as an interface to applications loaded on computer system 12 and data located on data security module 14. Accordingly, FIG. 7 illustrates a detailed illustration of the GUI and fingerprint authentication sub-system of data security system 10. As shown in bracket 94, the GUI is displayed on the monitor 12a (FIG. 1). The GUI contains multiple links or buttons in which the user may select specific applications located on computer system 12 and access data located on security module 14 (FIG. 1). These application links, indicated by bracket 96, include links to a web browser application, an email application, an address book application, a data encryption application, a data back-up/restore application, and a system directory application. It is recognized however, that the foregoing applications are merely exemplary and that data security system 10 may provide an interface to virtually any application located on the computer system.

Referring to a web browser application link 96a, data security system 10 is capable of storing bookmark and web site password/login information. Accordingly, a URL Factory provides any bookmark and password/login information to the web browser application. For example, the user may select the web browser application through the use of a conventional computer mouse by clicking on the associated web browser GUI link. The URL Factory provides the web browser with any stored bookmark data. Additionally, the URL Factory will search accessed websites for password/login fields and automatically input the registered password/login information within the proper field. Furthermore, the bookmark data supplied by the URL Factory is compatible with conventional browser bookmark files, such as those used by Internet Explorer®. During user registration, the user is prompted by data security system 10 to add and/or delete website password/login information as well as update bookmarks. The user also has the option of updating any website and bookmark information through use of the GUI display shown in bracket 94. Through use of the GUI display, the user may create bookmark folders, as well as import, export, and add bookmarks. The URL Factory also has pointers that contain specific information pertaining to accessed websites such as the number of frames contained within a website. Furthermore, because of the portability of data security system 10, the bookmark function enables the user to recall bookmarks saved on memory disk 14f (FIG. 2) at any computer in which the data security module 14 is connected. In contrast, when bookmarks are saved on conventional computer systems, the user is typically unable to recall the saved bookmarks on a different computer system. This difficulty of recalling saved bookmarks at different computer systems is substantially reduced through the use of data security system 10.

Additionally, as shown in bracket 96, the user may select an Email application link 96b. The Email application link 96b connects the user to any Email application, such as for example, Microsoft Outlook®. Accordingly, the user is prompted during user registration to provide any email password/login information for the respective email accounts. The user may also program the data security system 10 through the GUI to routinely check for incoming email messages. For instance, the user may program data security system 10 to check for incoming email every 5 minutes, once every day, or any time interval specified by the user. Furthermore, through use of the Email application link, the user may view, forward, receive, delete, and access multiple email accounts. For the email function, data security system 10 may also include stored data files that contain email information pertaining to the sender of the email message, the subject of the email, the date the email message was received, the entire text of the email message, and any other relevant email information. Accordingly, the data security system 10 GUI is capable of displaying a complete email message without requiring the user to directly open any email applications located on the computer system 12 (FIG. 2).

Through use of an Address Book application link 96c, the user may access any database containing listings of information. Data security system 10 enables the user to delete, export, and/or import information into the memory of the data security system 10. The Address Book function also enables displaying of information contained in most databases and information saved in memory. Accordingly, data security system 10 is capable of converting virtually any database type files to a predetermined format compatible with data security system 10. In one embodiment, the predetermined format is the data format known as, comma separated values (CSV), which is also compatible with virtually all conventional database related computer programs. Utilizing a common data format enables greater flexibility for the user to export and import address book data.

When the user selects a Data Encryption application link 96d within bracket 96, the user is enabled to encrypt or de-crypt any programs and data located on computer system 12 or data security system 10. Accordingly, once the user encrypts programs located on computer system 12, the user must be authenticated through the use of security module 14 prior to accessing the encrypted programs. The Data Encryption function enables the user to create an added level of data security to data located on computer system 12 (FIG. 1).

When the user selects a Data Backup/Restore application link 96e, the user may backup/restore any data located on data security system 10 or computer system 12 (FIG. 1). The user may also delete any cookies or temporary internet files located on data security system 10 or computer system 12.

Additionally, in the case that the user selects a System Directory application link 96f, the data security system 10 may access the memory disk 14f (FIG. 2) to locate any files or directories located on computer system 12 (FIG. 1). In some embodiments, the user may access the System Directory though use of the commonly available Microsoft Windows Explorer®. In other embodiments, data security system 10 accesses the stored files and directories located on memory disk 14f (FIG. 2) without accessing the system directory on computer system 12. Thus, the user is provided an additional level of data security when accessing system files and directories.

Following selection of an application by clicking on an application link in bracket 96, the user is required to undergo user verification through use of security module 14. Accordingly, as shown in bracket 98, the user is prompted to place his/her finger on the fingerprint sensor for authentication. During authentication, any registered user data is retrieved by the data security system 10 for comparison with the scanned fingerprint. In some embodiments, to prevent unauthorized access and modification, the registered user data may be encrypted. Consequently, during retrieval of the encrypted registered user data, the data security system 10 will de-crypt any encrypted registered user data. Upon user verification, the user is provided access to the application selected in bracket 96.

Various other modifications to the present invention may occur to those skilled in the art to which the present invention pertains. Other modifications not explicitly mentioned herein are also possible and within the scope of the present invention. It is the following claims, including all equivalents, which define the scope of the present invention.

What is claimed is:

1. A data security system for a computer system, comprising:
   a security module that is separate from the computer system;
   image data associated with a fingerprint of a user through the use of said security module, said image data being stored on said security module;
   an application interface generated by said security module and communicative with said computer system, where the application interface is displayed on said computer system;
   at least one software application that is stored on said computer system, where said security module controls access to said at least one software application by said image data; and
   at least one software data file used in said at least one software application, where said at least one software file is stored on said security module;
   wherein the application interface includes a graphical user interface, including at least one of a link and a button, the graphical user interface configured to select the at least one software application.

2. A system according to claim 1, wherein said security module is portable.

3. A system according to claim 1, wherein said security module comprises:
   a fingerprint sensor;
   a microprocessor communicative with said fingerprint sensor and adapted to store said image data; and
   a connector port coupled to said fingerprint sensor and said microprocessor.

4. A system according to claim 1, wherein said graphical user interface is displayed on said computer system.

5. A system according to claim 1, wherein said at least one software application comprises a web browser application, an email application, an address book application, a data encryption application, a data back-up application, and a system directory application.

6. A system according to claim 5, wherein said application interface for said web browser application includes a URL factory adapted to supply password/login and bookmark data to said application interface.

7. A security module for a computer system, comprising:
   a fingerprint sensor adapted to scan the fingerprint of a user;
   a microprocessor communicative with said fingerprint sensor, said microprocessor adapted to store data, encrypt data, and control access to said computer system;
   a memory location including at least one software data file used in a software application that is executable on said computer system;
   a connector port coupled to said fingerprint sensor and said microprocessor; and
   a connecting device that includes a first port for connection to the security module and a second port for connection to a computer system;
   wherein the security module is a separate component from the computer system, and wherein the security module generates an application interface displayed on said computer system, the application interface including a graphical user interface having at least one of a link and a button, the graphical user interface configured to select at least one software application stored on the computer system.

8. A module according to claim 7, wherein said fingerprint sensor is a silicon type sensor.

9. A module according to claim 7, wherein said connector port is a USB port.

10. A module according to claim 7, wherein said microprocessor has flash memory.

11. A module according to claim 7, wherein said microprocessor is adapted to store fingerprint data of a user.

12. A module according to claim 7, wherein said microprocessor comprises:
    a disk controller;
    a device lock controller communicative with said disk controller; and
    a memory disk communicative with said disk controller and said device lock controller.

13. A module according to claim 12, wherein said device lock controller is adapted to encrypt and decrypt data stored in said security module.

14. A module according to claim 7, wherein said microprocessor creates an encryption key that uniquely identifies a registered user.

15. A module according to claim 14, wherein said encryption key is comprised of a digital fingerprint template, at least one user password/login, and a randomly generated digit.

16. A module according to claim 7, wherein said microprocessor further comprises:
    a dynamic optimization control adapted to analyze each fingerprint scan.

17. A module according to claim 16, wherein said dynamic optimization control creates a digital composite of a fingerprint based on each fingerprint scan.

18. A module according to claim 7, wherein said fingerprint sensor utilizes an image matching method when authenticating a fingerprint of a user.

19. A module according to claim 7, wherein said fingerprint sensor utilizes a minutiae information calculating method when authenticating a fingerprint of a user.

20. A method of controlling access to and securing data located on a computer system, comprising the steps of:
    providing a data security system having a fingerprint sensor and a microprocessor with memory storage capability, wherein the security module is a separate component from the computer system;
    storing an encryption key having a registered user fingerprint template in said microprocessor;
    determining whether a fingerprint scanned by said fingerprint sensor matches said fingerprint template;
    displaying a graphical user interface including at least one of buttons and links to applications located on said computer system and said data security system when said scanned fingerprint matches said fingerprint template; and
    sending at least one software data file from said security module to said computer system, where said software data file is used in said applications.

21. A method according to claim 20, wherein the step of displaying a graphical user interface includes displaying links to applications including a web browser application, an email application, an address book application, a data encryption application, a data back-up application, and a system directory application.

22. A method according to claim 21, wherein the step of displaying a graphical user interface for said email application further includes displaying a complete email message.

23. A method according to claim 21, wherein the step of displaying a graphical user interface for said address book application further includes displaying information stored in memory or in a database.

24. A method according to claim 21, wherein the step of displaying a data encryption application includes providing an encrypting function for a user to encrypt and de-crypt data.

25. A method according to claim 21, wherein the step of displaying a data backup includes providing a data backup function for a user to backup data.

26. A method according to claim 20, wherein the step of storing an encryption key includes storing an encryption key comprising a digital fingerprint template, at least one user password/login, and a randomly generated digit.

27. The data security system according to claim 1, wherein said security module is portable such that the security module may be selectively connected with any one of a plurality of host computer systems, said plurality of host computer systems including said computer system and at least one additional computer system; and wherein said security module is configured to selectively display said application interface generated by said security module on one of the plurality of host computer systems when the security module is connected to the one of the plurality of host computer systems.

28. The data security system of claim 1, wherein the at least one software application stored on said computer system includes non-authorization information.

29. The data security system of claim 28, wherein the non-authorization information includes at least one of address book information and bookmark information.

* * * * *